(12) United States Patent
Long et al.

(10) Patent No.: US 11,560,669 B2
(45) Date of Patent: Jan. 24, 2023

(54) FIBER DYEING METHOD USING MIXED FLUID MEDIUM

(71) Applicant: SOOCHOW UNIVERSITY, Suzhou (CN)

(72) Inventors: Jiajie Long, Suzhou (CN); Chong Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 879 days.

(21) Appl. No.: 16/346,227

(22) PCT Filed: Oct. 25, 2018

(86) PCT No.: PCT/CN2018/111893
§ 371 (c)(1),
(2) Date: Apr. 30, 2019

(87) PCT Pub. No.: WO2020/077665
PCT Pub. Date: Apr. 23, 2020

(65) Prior Publication Data
US 2021/0324577 A1    Oct. 21, 2021

(30) Foreign Application Priority Data

Oct. 16, 2018 (CN) .......................... 201811202689.0

(51) Int. Cl.
*D06P 1/00* (2006.01)
*D06P 1/16* (2006.01)
*D06P 1/94* (2006.01)

(52) U.S. Cl.
CPC .............. *D06P 1/0016* (2013.01); *D06P 1/16* (2013.01); *D06P 1/94* (2013.01)

(58) Field of Classification Search
CPC ............. D06P 1/0016; D06P 1/16; D06P 1/94
See application file for complete search history.

(56) References Cited

U.S. PATENT DOCUMENTS

| 2001/0020311 A1* | 9/2001 | Veugelers | D06P 1/94 8/456 |
| 2015/0052692 A1* | 2/2015 | Lee | D06M 23/105 8/475 |
| 2016/0194825 A1* | 7/2016 | Long | D06B 5/12 68/184 |
| 2018/0119323 A1* | 5/2018 | Thies | D06B 15/09 |

FOREIGN PATENT DOCUMENTS

| CN | 1310257 A | 8/2001 | |
| CN | 102296469 | * 12/2011 | ............... D06P 1/16 |
| CN | 102296469 A | 12/2011 | |
| CN | 104420096 A | 3/2015 | |
| CN | 104562759 A | 4/2015 | |
| CN | 104594072 A | 5/2015 | |
| CN | 105133396 A | 12/2015 | |
| CN | 105713419 A | 6/2016 | |
| CN | 106835758 A | 6/2017 | |
| CN | 107558041 A | 1/2018 | |
| CN | 108411538 A | 8/2018 | |
| JP | 2001226884 A | 8/2001 | |
| JP | 2002201575 A | 7/2002 | |
| JP | 2006016711 A | 1/2006 | |
| WO | WO2016/180390 | * 11/2016 | ............... D06B 1/02 |

* cited by examiner

*Primary Examiner* — Amina S Khan
(74) *Attorney, Agent, or Firm* — SZDC Law P.C.

(57) ABSTRACT

The present invention relates to a waterless fiber dyeing method using a mixed fluid medium, in which supercritical carbon dioxide fluid medium is mixed with steam to form a mixed fluid medium, so that the waterless fiber dyeing effect to natural fibers is improved. The method of the invention can effectively modify the hydrophobic supercritical carbon dioxide fluid medium and improve the polarity thereof, thereby increasing the solubility of polar dye under the dyeing condition and simultaneously expanding the fiber. Thus, the present invention significantly improves the dyeability and dyeing behavior of the hydrophilic fibers in supercritical carbon dioxide fluids. The invention has the advantages of simple process, convenient operation and low energy consumption, and avoids consuming a large amount of water resources and discharging pollutants in the traditional process, and has the characteristics of environmentally friendly and high efficiency.

13 Claims, 2 Drawing Sheets

FIBER DYEING METHOD USING MIXED FLUID MEDIUM

This application is the National Stage Application of PCT/CN2018/111893, filed on Oct. 25, 2018, which claims priority to Chinese Patent Application No.: 201811202689.0, filed Oct. 16, 2018, which is incorporated by reference for all purposes as if fully set forth herein.

TECHNICAL FIELD

The invention relates to the technical field of textile dyeing and finishing, in particular to a waterless fiber dyeing method using a mixed fluid medium.

BACKGROUND

In recent years, supercritical fluid technology has been developed from the stage of theoretical research to the stage of practical applications, and has been improved and extended to many fields, such as supercritical fluid waterless dyeing, supercritical fluid extraction, supercritical fluid chemical reaction, supercritical fluid cleaning technology. Since the conditions of critical temperature and critical pressure of carbon dioxide are relatively easy to satisfy (31.1° C. and 7.38 MPa), and carbon dioxide is non-toxic, non-combustible, non-explosive, etc., it has become the most widely used supercritical fluid medium. Supercritical carbon dioxide fluid has high permeability and low viscosity similar to gases, and has a density and excellent solubility to non-polar materials similar to liquids. Therefore, it can dissolve a non-polar or weak-polar dye like liquids, and can infiltrate the dissolved dye into the fiber like gases to achieve the purpose of dyeing.

Supercritical carbon dioxide fluid is used as a dyeing medium instead of water, of which the basic theoretical basis is the principle of like dissolves like, wherein a suitable dye is dissolved in a fluid medium in a single molecule state, and then the supercritical carbon dioxide fluid carrying the dye is transferred to the fiber surface, so that the dye molecules are adsorbed, and further diffused and fixed inside the fibers to reach the purpose of dyeing. The dye with relatively simple structure, small molecular weight, and weak polarity is easily dissolved in the supercritical carbon dioxide fluid. Therefore, in the dyeing process using a supercritical carbon dioxide fluid as a medium, a hydrophobic disperse dye having a relatively small molecule and relatively weak polarity is generally used. At the same time, since synthetic fibers such as polyester are also hydrophobic, they are easily puffed in the supercritical carbon dioxide fluid, so that synthetic fibers can obtain excellent dyeing effects. Up to now, most synthetic fibers, such as polyester, dyed by disperse dyes in supercritical carbon dioxide fluid, can meet commercial standards.

However, for various natural fibers, usually because of the hydroxyl group, amino group and other groups, the polarity is relatively strong, in this case, it is generally necessary to first perform moisture absorption and puffing in a water bath in the traditional water bath dyeing process, and then perform dyeing using water soluble dyes such as direct dyes, reactive dyes and acid dyes. However, the supercritical carbon dioxide fluid medium has a low polarity, leading that the water soluble dyes with high polarity cannot not be dissolved well or even undissolvable; while general disperse dyes dissolved in the supercritical carbon dioxide fluid cannot achieve good dyeing depth and color fastness because of low affinity or directness to natural fibers since its molecular weight is small and its molecular structure is simple, i.e. various natural fibers cannot be dyed well. More importantly, the hydrophobic carbon dioxide fluid cannot effectively puff the natural fibers in the dry state, and cannot provide the necessary conditions for dyeing, especially diffusion of the dye molecules. Therefore, it is of great significance to solve the problem of dyeing natural fibers in the supercritical carbon dioxide fluid.

SUMMARY OF THE INVENTION

In order to solve the above technical problems, the present invention provides a waterless fiber dyeing method using a mixed fluid medium, in which supercritical carbon dioxide fluid medium is mixed with steam in a proportion under certain conditions to form the mixed fluid as processing medium for waterless dyeing.

In the present invention, the steam is used to improve the polarity of the supercritical carbon dioxide fluid medium to increase the solubility of the dye in the mixed fluid medium, and the steam is also used to puff the dry natural fibers to provide the necessary conditions for adsorption of the dye.

Preferably, the method includes the following steps:

(1) loading dry fibers layer by layer in a special porous yarn cage at a certain compactness, wherein the dry fibers are compacted mechanically;

(2) placing the yarn cage after loading fibers in step (1) in a high pressure dyeing tank, and then sealing the dyeing tank and introducing suitable non-carbon dioxide medium (such as the above-mentioned steam) to preprocess the dry fiber layers under a certain pressure for a certain time;

(3) after preprocessing in step (2), introducing supercritical carbon dioxide medium and a dissolved dye into the high pressure dyeing tank, and supercharging, heating the yarn cage and dyeing by holding temperature according to a preset dyeing process;

(4) after dyeing, removing unfixed dyes by an online way under certain conditions by clean supercritical carbon dioxide medium and cooling dyeing system, and then recycling the fluid medium in the dyeing system to recover the pressure to atmospheric pressure and opening the dyeing tank to complete the waterless fiber dyeing in supercritical carbon dioxide fluid medium.

Preferably, in step (1), the dry fibers are short natural fibers such as cotton, or processed hemp loose fibers, or synthetic fibers such as artificial fibers made from viscose, polyester, nylon or acrylic.

Preferably, in step (1), loose fibers are compacted layer by layer uniformly by a mechanical external force, so that the fibers can be loaded regularly at a certain compactness. By being compacted layer by layer, the density of the fibers is more uniform, which helps to improve the uniformity of dyeing.

Preferably, in step (1), the dry fibers have a compactness of 50-300 kg/m$^3$ when loaded layer by layer in the yarn cage.

Preferably, the porous yarn cage in step (1) is coated with Teflon or other non-conductive surface materials, and a plurality of apertures are distributed on the periphery of the yarn cage and on its central hollow tube. During the dyeing process, the temperature in the dyeing tank is usually above 100° C. The Teflon or non-conductive surface materials can reduce the heat transferred to the fibers in the yarn cage and avoid damage to the fibers.

Preferably, the suitable non-carbon dioxide medium used in step (2) is selected from the group consisting of saturated steam, superheated steam, and other polar solvents. The polar solvents can be methanol, ethanol, acetone or the like.

Preferably, in step (2), the dry fiber layers are preprocessed under a pressure of 0-1 MPa for 5-180 min.

Preferably, in step (3), the dissolved dye is an active disperse dye with an active group selected from the group consisting of a vinyl sulfone, a vinyl group, an s-triazine type, a nicotinic acid structure, and derivatives thereof.

Preferably, in step (3), the dissolved dye is dissolved in a solvent selected from the group consisting of supercritical carbon dioxide, ethanol, acetone, methanol, and deionized water.

Preferably, in step (3), two solvents are mixed at the ratio of 1:5 to 5:1.

Preferably, in step (3), during dyeing process, the mixed fluid is circulated in the dyeing system by a circulation pump, so that the dye molecules are in sufficient contact with the fibers. More preferably, the fluid in the dyeing system alternates between two states, i.e., after the fluid circulates for a certain time, the circulation pump is turned off and the fluid is static for a certain time, and then the circulation pump is started again, and the above operation is repeated, so that the fluid alternates between two states of motion.

Preferably, in step (3), in the preset dyeing process, the temperature is 50-160° C., the pressure is 7-35 MPa, a ratio of dynamic and static cycle time of the fluid is 1:5-10:1, and the processing time is 10~180 min.

Preferably, in step (4), during removing unfixed dyes by an online way, the conditions include that the temperature is 30-100° C., the pressure is 8-35 MPa, a ratio of dynamic and static cycle time is 1:5-10:1, and the processing time is 10~120 min.

Preferably, in step (4), after the dyeing is completed, the carbon dioxide is recycled by a recycling system, and the carbon dioxide in the dyeing system is recovered to atmospheric pressure for direct opening of the dyeing tank.

The technical solution in the present invention has the following significant features and advantages: in the present invention, the supercritical carbon dioxide fluid medium is mixed with steam in a proportion under certain conditions to form a mixed fluid as processing medium for waterless dyeing. Thereby, the polarity of the supercritical carbon dioxide fluid medium is improved, so that the solubility of the dye in the mixed fluid medium is increased; meanwhile, the dry natural fibers are puffed effectively, which provides a necessary condition for dye adsorption and dyeing. Therefore, the present invention can effectively improve the dyeing properties of natural fibers. Moreover, the process is simple, no traditional water bath is needed, no dyeing wastewater is generated, and the required process flow is short and the efficiency is high. After the dyeing is finished, the fibers can be cleaned by the fluid to remove unfixed dyes by an online way, thereby obtaining waterless dyed dry fiber products with good quality.

The above description is only an overview of the technical solutions in the present invention, and the technical means of the present invention can be more clearly understood and implemented in accordance with the contents of the description. Hereinafter, some embodiments of the present invention will be described in detail with reference to the accompanying drawings.

BRIEF DESCRIPTION OF DRAWINGS

wherein: 1—carbon dioxide storage tank; 2, 6, 9, 11, 11', 13, 14, 15—shut-off valves; 3—condenser; 4—booster pump; 5—preheater; 7—dye dissolving unit; 8—filter; 10—fiber dyeing tank; 12—circulating pump; 12'—gas recycling pump; 15—micrometering valve; 16, 19—thermometer; 17, 20—pressure gauge; 18—separation kettle; 21—purifier.

DETAILED DESCRIPTION OF THE EMBODIMENTS

The present invention will be further described with reference to the drawings and specific embodiments, so that those skilled in the art can understand the invention better and implement it, but these embodiments are not intended to limit the invention.

The staple fiber used in the embodiment is a pure cotton fiber, which is dry fiber not processed before dyeing; the dye used is active disperse yellow or active disperse red for supercritical carbon dioxide.

Figure 1:
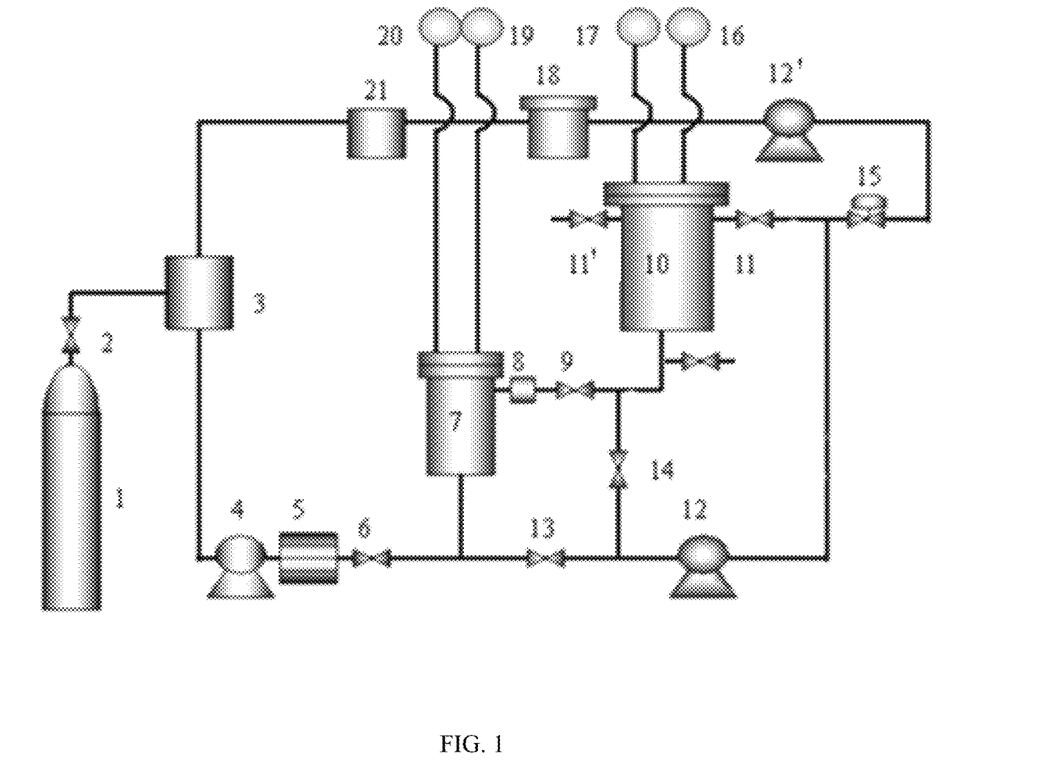
FIG. 1 is a schematic diagram of a system for dyeing fabrics in a supercritical carbon dioxide fluid according to an embodiment of the present invention.
Figure 2:
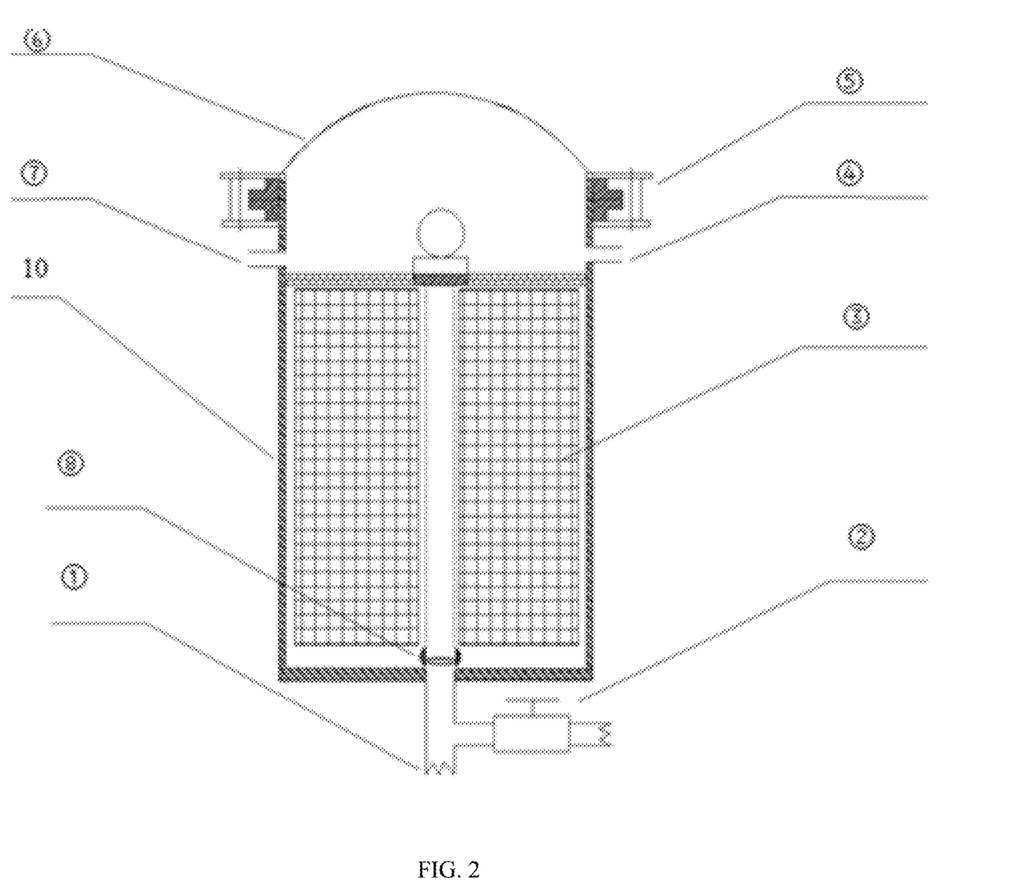
FIG. 2 is a cross-sectional view of the dyeing tank, wherein: ①-fluid and dye inlet; ②-inlet shut-off valve for non-carbon dioxide medium; ③-porous yarn cage; ④-fluid outlet; ⑤-quick opening structure; ⑥-dyeing tank seal cover; ⑦-inlet for non-carbon dioxide medium; ⑧-port.

Referring to FIG. 1 and FIG. 2, the steps of waterless fiber dyeing method using a mixed fluid medium in an embodiment of the present invention are as follows: dry fibers are loaded layer by layer in a porous yarn cage, wherein the dry fibers are compacted mechanically to a certain compactness (see the porous yarn cage in FIG. 2), and then the yarn cage is sealed and the seal cover of dyeing tank ⑥ is closed; the shut-off valves 9, 14 are closed, the inlet shut-off valve ② for non-carbon dioxide medium is opened and a certain amount of saturated steam is introduced into the dying tank; the shut-off valves ②, shut-off valves 11, 11' are closed, and the shut-off valve 9 is opened, dissolved dye and carbon dioxide fluid are introduced into the dyeing tank 10 (as shown in FIG. 1). According to a preset dyeing process and parameters, a pressurization system including a carbon dioxide storage tank 1, a condenser 3, a booster pump 4, and a preheater 5 is started to pressurize the dyeing circulation system and heat the fluid, so that a mixed fluid medium is formed and the dye in the dye dissolving unit 7 is sufficiently dissolved. When the temperature of the dyeing circulation system reaches a preset value such as 120° C. and the pressure reaches a preset value such as 20 MPa, the booster pump 4 is stopped, the shut-off valve 6 is closed, and the circulation pump 12 in the dyeing circulation circuit is enabled. The dissolved dye is circulated with the formed mixed fluid and the fibers are sufficiently dyed. The ratio of dynamic time to static time for the mixed fluid during dyeing is 5:1. Under static and circulation conditions, the dissolved dyes are in sufficient contact with the fibers in the porous yarn cage 3 through their own molecular thermal motion and fluid mass transfer, and the dyes are adsorbed, diffused and fixed.

After dyeing by holding temperature and pressure, the micrometering valve 15 is opened to depressurize the system, and the dye and mixed fluid in the dyeing circulation system are separated and recycled by a separating and recycling system including a gas recycling pump 12', a separation kettle 18, a purifier 21 and a condenser 3.

After the mixed fluid is separated and recycled, the above operation is repeated to remove unfixed dyes by an online way by the carbon dioxide fluid, wherein the temperature is 30-100° C., the pressure is 8-35 MPa, the ratio of dynamic time to static time of the carbon dioxide fluid is 1:5-10:1, and the cleaning time is 10~120 min. After the cleaning is completed, the gas and dye are separated and recycled by a pressure relief system, and the pressure in the dyeing tank is lowered to atmospheric pressure. Finally, the fiber dyeing tank 10 is opened, and the dyed fibers are taken out from the yarn cage. Referring to the above-mentioned processing steps, the fibers are dyed with the active disperse dye. The results of analysis and test are as follows:

1. Measurement of Color Characteristic Value and Evaluation of Levelness of Waterless Dyed Fiber Samples Surface color depth (K/S) and chroma values (L*, a*, b*, C*, and h°) of waterless dyed fiber samples in the mixed fluid medium are measured using a HunterlabUltrascan PRO spectrophotometer. During the test, a $D_{65}$ light source is selected with a viewing angle of 10°, the samples are uniformly mixed fibers, and each sample is randomly tested for 8 points, and finally calculating an arithmetic mean.

The levelness of the fiber is evaluated by a standard deviation of the surface color depth at the maximum absorption wavelength of the sample to be tested ($\sigma_{K/S(\lambda_{max})}$), which is calculated as in (1).

$$\sigma_{K/S(\lambda_{max})} = \sqrt{\frac{\sum_{i=1}^{n}[(K/S)_{i,\lambda_{max}} - \overline{K/S}(\lambda_{max})]^2}{n-1}} \quad (1)$$

$$\overline{K/S}(\lambda_{max}) = \frac{1}{n}\sum_{i=1}^{n}(K/S)_{i,\lambda_{max}} \quad (2)$$

wherein i represents the i-th test point (i=1, 2, 3, ..., n; here n=8); $(K/S)_{i,\lambda_{max}}$ represents the surface color depth at the maximum absorption wavelength of the i-th test point; $\overline{K/S}(\lambda_{max})$ represents the arithmetic mean of the surface color depth of the n test points at the maximum absorption, as calculated in (2).

2. Color Fastness Performance Test

According to GB/T 3921-2008 about evaluation to the waterless dyed fiber samples in mixed fluid medium for fastness to soaping, some samples are sutured with an adjacent fabric with multi-fibre components (SDC Multifiber DW, SDC enterprises CO., Ltd., UK) as a combined sample, the soap concentration is 5 g/L, the bath ratio is 1:50, and the washing fastness tester is operated at a temperature of 40° C. for 30 min. After washing, the combined sample is taken out and rinsed with water, and allowed to dry naturally at room temperature. Then, under the $D_{65}$ light source, the discoloration degree of the sample and the staining degree of the adjacent fabric are respectively evaluated by grey scale for assessing change in color and grey scale for assessing staining.

Embodiment 1

Table 1.1 and Table 1.2 show the experimental results of dyeing of pure cotton fibers using an active disperse yellow dye (o.m.f of 5%) by the method described in this embodiment. The content of steam in the mixed fluid was 2.5 g/L during dyeing process, and 10 ml of acetone was added to the dye dissolving unit to pre-dissolve the dye. The dyeing was performed as follows: 20 MPa mixed fluid medium was utilized, the fibers were dyed by the static mixed fluid for 5 minutes followed by the cycled mixed fluid for 1 minute, the dyeing temperature was 120° C., and the total dyeing time was 60 min. After the dyeing was completed, the cleaning temperature with supercritical carbon dioxide fluid was 80° C., the pressure was 20 MPa, the fibers were dyed by the static mixed fluid for 5 minutes followed by the cycled mixed fluid for 1 minute, and the total cleaning time was 30 min.

TABLE 1.1

Measurement of the color characteristic value and evaluation of levelness of the sample in Embodiment 1

| Sample No. | L* | a* | b* | C* | h° | $\overline{K/S}$ ($\lambda_{max}$, nm; 410 nm) | $\sigma_{K/S(\lambda_{max})}$ |
|---|---|---|---|---|---|---|---|
| 1 | 75.70 | 0.59 | 19.96 | 19.97 | 88.30 | 1.124 | 0.045 |

TABLE 1.2

Evaluation of color fastness to washing of the sample in Embodiment 1

| Sample No. | fade | fastness to soaping staining |||||||
| | | cotton | wool | acrylic | polyester | nylon | acetate |
|---|---|---|---|---|---|---|---|
| 1 | 3-4 | 3-4 | 3-4 | 5 | 5 | 3-4 | 4 |

The experimental results in Table 1.1 show that, by means of the waterless fiber dyeing method using the mixed fluid medium in the present invention, a good dyeing effect can be achieved for the dry cotton fibers using the active disperse yellow dye. The hue angle h° of the waterless fiber dyed sample in Embodiment 1 is 88.30, and the yellow color light is relatively pure and the color is relatively bright. At the same time, at a large fluid ratio of 1:2000, the surface color depth value $\overline{K/S}(\lambda_{max})$ can reach 1.124, which shows that it has good dyeing and fixing properties under the technical conditions of the present invention. Meanwhile, Table 1.1 also shows that the standard deviation of the surface color depth value of the sample in Embodiment 1 is relatively small, which value of $\sigma_{K/S(\lambda_{max})}$ is 0.045, indicating that the sample in Embodiment 1 has excellent leveling property.

Table 1.2 shows that the conventional color fastness of the sample in Embodiment 1 is good, and the color fading level is 3-4. The color fastness to acrylic, polyester and acetate can reach 4 level or above. For cotton, wool, nylon, the color fastness is also 3-4 level.

Embodiment 2

Table 2.1 and Table 2.2 are experimental results of dyeing of pure cotton fiber using an active disperse yellow dye (o.m.f of 5%) by the method described in this embodiment. The content of steam in the mixed fluid is 2.5 g/L during dyeing process, and 10 ml of methyl alcohol is added to the dye dissolving unit to pre-dissolve the dye. The dyeing conditions are 20 MPa mixed fluid medium, the fibers are dyed by the static mixed fluid for 5 minutes followed by the cycled mixed fluid for 1 minute, the dyeing temperature is 120° C., and the total dyeing time is 60 min. After the dyeing is completed, the cleaning temperature with supercritical carbon dioxide fluid is 80° C., the pressure is 20 MPa, the fibers are dyed by the static mixed fluid for 5 minutes followed by the cycled mixed fluid for 1 minute, and the total cleaning time is 30 min.

TABLE 2.1

Determination of the color characteristic value and
evaluation of levelness of the sample in embodiment 2

| Sample NO. | L* | a* | b* | C* | h ° | $\overline{K/S}$ ($\lambda_{max}$, nm, 410 nm) | $\sigma_{K/S(\lambda_{max})}$ |
|---|---|---|---|---|---|---|---|
| 2 | 74.88 | 2.04 | 23.14 | 23.23 | 84.97 | 1.280 | 0.022 |

TABLE 2.2

Evaluation of color fastness to washing
of the sample in embodiment 2

| Sample NO. | fade | fastness to soaping staining | | | | | |
| | | cotton | wool | acrylic | polyester | nylon | acetate |
|---|---|---|---|---|---|---|---|
| 2 | 3-4 | 4 | 4 | 5 | 5 | 4 | 4-5 |

The experimental results in Table 2.1 show that, with the waterless fiber dyeing method using the mixed fluid medium in the present invention, a good dyeing effect on the dry cotton fiber can be achieved with the active disperse yellow dye. The hue angle h° of the sample in embodiment 2 is 84.97, and the yellow color light is also relatively pure, the color is relatively bright, and the C* value is increased to 23.23. At the same time, the sample in Embodiment 2 is also under fluid conditions with the same large proportion, the surface color depth value $\overline{K/S}(\lambda_{max})$ can also reach 1.280, which also demonstrates that the sample in Embodiment 2 has good dyeing and fixing properties. Meanwhile, Table 2.1 also shows that the standard deviation of the surface color depth value of the sample in embodiment 2 is relatively small, which value of $\sigma_{K/S(\lambda_{max})}$ is 0.022, indicating that the sample in Embodiment 2 has excellent leveling property.

Table 2.2 shows that the conventional color fastness of the sample in Embodiment 2 is good, and the colour fading level is 3-4. The color fastness to cotton, wool, acrylic, polyester, nylon and acetate can reach 4 or above, and the color fastness to washing is good.

Embodiment 3

Table 3.1 and Table 3.2 are experimental results of dyeing of pure cotton fiber using an active disperse yellow dye (o.m.f of 2%) by the method described in this embodiment. The content of steam in the mixed fluid is 5 g/L during dyeing process, and 15 ml of acetone is added to pre-dissolve the dye. The dyeing conditions are 20 MPa mixed fluid medium, the fibers are dyed by the static mixed fluid for 5 minutes followed by the cycled mixed fluid for 1 minute, the dyeing temperature is 130° C., and the total dyeing time is 40 min. After the dyeing is completed, the cleaning temperature with supercritical carbon dioxide fluid is 80° C., the pressure is 20 MPa, the fibers are dyed by the static mixed fluid for 5 minutes followed by the cycled mixed fluid for 1 minute, and the total cleaning time is 30 min.

TABLE 3.1

Determination of the color characteristic value and
evaluation of levelness of the sample in embodiment 3

| Sample NO. | L* | a* | b* | C* | h ° | $\overline{K/S}$ ($\lambda_{max}$, nm, 425) | $\sigma_{K/S(\lambda_{max})}$ |
|---|---|---|---|---|---|---|---|
| 3 | 80.38 | 9.00 | 21.21 | 23.04 | 87.02 | 0.949 | 0.020 |

TABLE 3.2

Evaluation of color fastness to washing
of the sample in embodiment 3

| Sample NO. | fade | fastness to soaping staining | | | | | |
| | | cotton | wool | acrylic | polyester | nylon | acetate |
|---|---|---|---|---|---|---|---|
| 3 | 4 | 4 | 4-5 | 4-5 | 5 | 4 | 4-5 |

The experimental results in Table 3.1 show that, with the waterless fiber dyeing method using the mixed fluid medium in the present invention, a good dyeing effect on the dry cotton fiber can be achieved with the active disperse yellow dye. The hue angle h° of the sample is 87.02, the yellow color light is also relatively pure. Its C* value is 23.04, and the color is relatively bright. At the same time, Embodiment 3 is also implemented under fluid conditions with the same large proportion, the surface color depth value $\overline{K/S}(\lambda_{max})$ can also reach 0.949, which also demonstrates that the special dye has good dyeing and fixing properties on the dry cotton fiber in Embodiment 3. Meanwhile, Table 3.1 also shows that the standard deviation of the surface color depth value of the sample under the experiment condition is relatively small, which value of $\sigma_{K/S(\lambda_{max})}$ is 0.020, indicating that the waterless fiber dyed sample in Embodiment 3 has excellent leveling property.

Table 3.2 shows that the conventional color fastness of the sample in Embodiment 3 is good, and the color fastness level is 4. The color fastness to cotton, wool, acrylic, polyester, nylon and acetate can reach 4 or above, and the colour fastness to washing is good.

Embodiment 4

Table 4.1 and Table 4.2 are experimental results of dyeing of pure cotton fiber using an active disperse red dye (o.m.f of 2%) by the method described in this embodiment. The content of steam in the mixed fluid is 5 g/L during dyeing process, and 15 ml of acetone is added to pre-dissolve the dye. The dyeing conditions are 20 MPa mixed fluid medium, the fibers are dyed by the static mixed fluid for 5 minutes followed by the cycled mixed fluid for 1 minute, the dyeing temperature is 130° C., and the total dyeing time is 40 min. After the dyeing is completed, the cleaning temperature with the supercritical carbon dioxide fluid is 80° C., the pressure is 20 MPa, the fibers are dyed by the static mixed fluid for 5 minutes followed by the cycled mixed fluid for 1 minute, and the total cleaning time is 30 min.

TABLE 4.1

Measurement of the color characteristic value and evaluation of levelness of the sample in embodiment 4

| Sample NO. | L* | a* | b* | C* | h ° | $\overline{K/S}$ ($\lambda_{max}$, nm, 510) | $\sigma_{K/S(\lambda_{max})}$ |
|---|---|---|---|---|---|---|---|
| 4 | 66.73 | 15.00 | 1.14 | 15.04 | 4.36 | 0.954 | 0.051 |

TABLE 4.2

Evaluation of color fastness to washing of the sample in embodiment 4

| Sample NO. | fade | \multicolumn{6}{c}{fastness to soaping staining} |
|---|---|---|---|---|---|---|---|

| Sample NO. | fade | cotton | wool | acrylic | polyester | nylon | acetate |
|---|---|---|---|---|---|---|---|
| 4 | 4 | 4 | 4-5 | 4-5 | 4-5 | 4-5 | 5 |

The experimental results in Table 4.1 show that, with the waterless fiber dyeing method using the mixed fluid medium in the present invention, a good dyeing effect on the dry cotton fiber can be achieved with the active disperse red dye. The hue angle h° of the sample is 4.36, the value of chroma index b* is relatively small, and the red color light is relatively pure. Its C* value is 15.01, and the color is relatively bright. At the same time, Embodiment 4 is also implemented under fluid conditions with the same large proportion, the surface color depth value $\overline{K/S}(\lambda_{max})$ can also reach 0.954, which also demonstrates that the special dye has good dyeing and fixing properties on the dry cotton fiber in Embodiment 4. In addition, Table 4.1 also shows that the standard deviation of the surface color depth value of the sample is relatively small, which value of $\sigma_{K/S(\lambda_{max})}$ is 0.051, indicating that the waterless fiber dyed sample in Embodiment 4 has excellent leveling property.

Table 4.2 shows that the conventional color fastness of the sample is also good with the waterless fiber dyeing method using the mixed fluid in the present invention. Its fading fastness can reach level 4. The color fastness to cotton, wool, acrylic, polyester, nylon and acetate can reach 4 or above, and the color fastness to washing is good. Therefore, the above results show that under the condition that the dry cotton fibers are dyed with active disperse red, the waterless dyeing effect is still good, indicating that the waterless fiber dyeing technology using the mixed fluid in the present invention is feasible and can obtain good waterless dyeing effect on natural fibers.

Embodiment 5

Table 5.1 and Table 5.2 are experimental results of dyeing of pure cotton fiber using an active disperse yellow dye (o.m.f of 2%) by the method described in this embodiment. 7.5 g/L of saturated steam is introduced into the yarn cage before dyeing to perform preprocessing, and 15 ml of acetone is added in the dye dissolving unit to pre-dissolve the dye. The dyeing conditions are 20 MPa supercritical carbon dioxide fluid, the fibers are dyed by the static fluid for 5 minutes followed by the cycled fluid for 1 minute, the dyeing temperature is 130° C., and the total dyeing time is 60 min. After the dyeing is completed, the cleaning temperature is 80° C., the pressure is 20 MPa, the fibers are dyed by the static fluid for 5 minutes followed by the cycled fluid for 1 minute, and the total cleaning time is 30 min.

TABLE 5.1

Determination of the color characteristic value and evaluation of levelness of the sample in embodiment 5

| Sample NO. | L* | a* | b* | C* | h ° | $\overline{K/S}$ ($\lambda_{max}$, nm, 410 nm) | $\sigma_{K/S(\lambda_{max})}$ |
|---|---|---|---|---|---|---|---|
| 5 | 81.30 | 2.86 | 20.92 | 22.34 | 85.42 | 0.921 | 0.054 |

TABLE 5.2

Evaluation of color fastness to washing of the sample in embodiment 5

| Sample NO. | fade | cotton | wool | acrylic | polyester | nylon | acetate |
|---|---|---|---|---|---|---|---|
| 5 | 3-4 | 4 | 4-5 | 5 | 5 | 4 | 4 |

The experimental results in Table 5.1 show that, with the waterless fiber dyeing method of the present invention, a good dyeing effect on the dry cotton fiber can be achieved with the active disperse yellow dye. The hue angle h° of the waterless fiber dyed sample in Embodiment 5 is 85.42, and the yellow color light is relatively pure, the chroma value C* is 22.34, and the color is relatively bright. At the same time, the sample in Embodiment 5 is also under fluid conditions with the same large proportion of 1:2000, the surface color depth value $\overline{K/S}(\lambda_{max})$ can also reach 0.921, which also demonstrates that the sample in Embodiment 5 after preprocessing has good dyeing and fixing properties. Meanwhile, Table 5.1 also shows that the standard deviation of the surface color depth value of the sample in embodiment 5 is relatively small, which value of $\sigma_{K/S(\lambda_{max})}$ is 0.054, indicating that the sample in Embodiment 5 has excellent leveling property.

Table 5.2 shows that the conventional color fastness of the sample in Embodiment 5 is also good with the waterless fiber dyeing method of the present invention. Its fade grade is 3-4. The color fastness to cotton, wool, acrylic, polyester, nylon and acetate can reach 4 or above, and the color fastness to washing is good.

Embodiment 6

Table 6.1 and Table 6.2 are experimental results of dyeing of pure cotton fiber using an active disperse yellow dye (o.m.f of 2%) by the method described in this embodiment. 10 g/L of saturated steam is introduced into the yarn cage before dyeing to perform preprocessing, and 15 ml of acetone is added in the dye dissolving unit to pre-dissolve the dye. The dyeing conditions are 20 MPa supercritical carbon dioxide fluid, the fibers are dyed by the static fluid for 5 minutes followed by the cycled fluid for 1 minute, the dyeing temperature is 130° C., and the total dyeing time is 90 min. After the dyeing is completed, the cleaning temperature is 80° C., the pressure is 20 MPa, the fibers are dyed by the static fluid for 5 minutes followed by the cycled fluid for 1 minute, and the total cleaning time is 30 min.

TABLE 6.1

Determination of the color characteristic value and evaluation of levelness of the sample in embodiment 6

| Sample | L* | a* | b* | C* | h° | $\overline{K/S}$ ($\lambda_{max}$, nm, 410 nm) | $\sigma_{K/S(\lambda_{max})}$ |
|---|---|---|---|---|---|---|---|
| 6 | 74.45 | 1.98 | 24.45 | 23.35 | 82.35 | 1.217 | 0.035 |

TABLE 6.2

Evaluation of color fastness to washing of the sample in embodiment 6

| Sample NO. | fade | \multicolumn{6}{c}{fastness to soaping Staining} |
|---|---|---|---|---|---|---|---|

| Sample NO. | fade | cotton | wool | acrylic | polyester | nylon | acetate |
|---|---|---|---|---|---|---|---|
| 6 | 4 | 4 | 4-5 | 5 | 5 | 4 | 4-5 |

The experimental results in Table 6.1 show that, with the waterless fiber dyeing method of the present invention, a good dyeing effect on the dry cotton fiber can be achieved with the active disperse yellow dye. The hue angle h° of the waterless fiber dyed sample in Embodiment 6 is 82.35, and the yellow color light is relatively pure, the chroma value C* is 23.35, and the color is relatively bright. At the same time, the sample in Embodiment 6 is also under fluid conditions with the same large proportion, the surface color depth value $\overline{K/S}(\lambda_{max})$ can also reach 1.217, which also demonstrates that the sample in Embodiment 6 after preprocessing has good dyeing and fixing properties. Meanwhile, Table 6.1 also shows that the standard deviation of the surface color depth value of the sample in Embodiment 6 is relatively small, which value of $\sigma_{K/S(\lambda_{max})}$ is 0.035, indicating that the sample in Embodiment 6 has excellent leveling property.

Table 6.2 shows that the conventional color fastness of the sample in Embodiment 6 is also good with the waterless fiber dyeing method of the present invention. Its fade grade is 4. The color fastness to cotton, wool, acrylic, polyester, nylon and acetate can reach 4 or above, and the color fastness to washing is good. The above results show that the present invention can obtain a good waterless dyeing effect on the sample in Embodiment 6.

Embodiment 7

Table 7.1 and table 7.2 are experimental results of dyeing of pure cotton fiber using an active dispersive red dye (o.m.f of 2%) by the method described in this embodiment. 7.5 g/L of saturated steam is introduced into the yarn cage before dyeing to perform preprocessing, and 15 ml of acetone is added in the dye dissolving unit to pre-dissolve the dye. The dyeing conditions include that the supercritical carbon dioxide fluid is under a pressure of 22 MP, the fibers are dyed by the static fluid for 5 minutes followed by the cycled fluid for 1 minute, the dyeing temperature is 130° C., and the total dyeing time is 60 min. After the dyeing is completed, the cleaning temperature is 80° C., the pressure is 20 MPa, the fibers are dyed by the static fluid for 5 minutes followed by the cycled fluid for 1 minute, and the total cleaning time is 30 min.

TABLE 7.1

Determination of the color characteristic value and evaluation of levelness of the sample in embodiment 7

| Sample NO. | L* | a* | b* | C* | h° | $\overline{K/S}$ ($\lambda_{max}$, nm, 510 nm) | $\sigma_{K/S(\lambda_{max})}$ |
|---|---|---|---|---|---|---|---|
| 7 | 72.56 | 20.35 | 1.87 | 23.89 | 2.01 | 1.275 | 0.019 |

TABLE 7.2

Evaluation of color fastness to washing of the sample in embodiment 7

| Sample NO. | fade | cotton | wool | acrylic | polyester | nylon | acetate |
|---|---|---|---|---|---|---|---|
| 7 | 4 | 4 | 4-5 | 5 | 5 | 4-5 | 4 |

The experimental results in Table 7.1 show that, with the waterless fiber dyeing method of the present invention, a good dyeing effect on the dry cotton fiber can be achieved with the active disperse red dye. The hue angle h° of the waterless fiber dyed sample in Embodiment 7 is 2.01, and the yellow color light is relatively pure, the chroma value C* is 23.89, and the color is relatively bright. At the same time, the sample in Embodiment 7 is also under fluid conditions with the same large proportion, the surface color depth value $\overline{K/S}(\lambda_{max})$ can also reach 1.275, which also demonstrates that the sample in Embodiment 7 after preprocessing has good dyeing and fixing properties. Meanwhile, Table 7.1 also shows that the standard deviation of the surface color depth value of the sample in embodiment 7 is relatively small, which value of $\sigma_{K/S(\lambda_{max})}$ is 0.019, indicating that the sample in Embodiment 7 has excellent leveling property.

Table 7.2 shows that the conventional color fastness of the sample in Embodiment 7 is also good with the waterless fiber dyeing method of the present invention. Its fade grade is 4. The color fastness to cotton, wool, acrylic, polyester, nylon and acetate can reach 4 or above, and the colour fastness to washing is good. The above results show that the present invention can obtain a good waterless dyeing effect on the sample in Embodiment 7.

Embodiment 8

Table 8.1 and Table 8.2 are experimental results of dyeing of pure cotton fiber using an active disperse red dye (o.m.f of 2%) by the method described in this embodiment. 10 g/L of saturated steam is introduced into the yarn cage before dyeing to perform preprocessing, and 15 ml of acetone is added in the dye dissolving unit to pre-dissolve the dye. The dyeing conditions are 20 MPa supercritical carbon dioxide fluid, the fibers are dyed by the static fluid for 5 minutes followed by the cycled fluid for 1 minute, the dyeing temperature is 130° C., and the total dyeing time is 90 min. After the dyeing is completed, the cleaning temperature is 80° C., the pressure is 20 MPa, the fibers are dyed by the static fluid for 5 minutes followed by the cycled fluid for 1 minute, and the total cleaning time is 30 min.

TABLE 8.1

Determination of the color characteristic value and
evaluation of levelness of the sample in embodiment 8

| Sample NO. | L* | a* | b* | C* | h° | $\overline{K/S}$ ($\lambda_{max}$, nm, 510 nm) | $\sigma_{K/S(\lambda_{max})}$ |
|---|---|---|---|---|---|---|---|
| 8 | 70.86 | 20.87 | 1.90 | 25.98 | 1.27 | 1.326 | 0.087 |

TABLE 8.2

Evaluation of color fastness to washing
of the sample in embodiment 8

| | fastness to soaping | | | | | | |
|---|---|---|---|---|---|---|---|
| Sample | | Staining | | | | | |
| NO. | fade | cotton | wool | acrylic | polyester | nylon | acetate |
| 8 | 4 | 4 | 4 | 5 | 5 | 4-5 | 4-5 |

The experimental results in Table 8.1 show that, with the waterless fiber dyeing method of the present invention, a good dyeing effect on the dry cotton fiber can be achieved with the active disperse red dye. The hue angle h° of the sample in Embodiment 8 is 1.27, and the red color light is also relatively pure, the color is more bright, and the C* value is increased to 25.98. At the same time, the sample in Embodiment 8 is also under fluid conditions with the same large proportion, the surface color depth value $\overline{K/S}(\lambda_{max})$ can also reach 1.326, which also demonstrates that the sample in Embodiment 8 after preprocessing has good dyeing and fixing properties. Meanwhile, Table 8.1 also shows that the standard deviation of the surface color depth value of the sample in Embodiment 8 is relatively small, which value of $\sigma_{K/S(\lambda_{max})}$ is 0.087, indicating that the sample in Embodiment 8 has excellent leveling property.

Table 8.2 shows that the conventional color fastness of the sample in Embodiment 8 is also good with the waterless fiber dyeing method of the present invention. Its fade grade is 4. The color fastness to cotton, wool, acrylic, polyester, nylon and acetate can reach 4 or above, and the color fastness to washing is good.

It can be seen from the above embodiments that, in the waterless fiber dyeing method using a mixed fluid medium of the present invention, the polarity of the carbon dioxide fluid is improved by mixing a certain proportion of steam into the fluid, which improves the dyeability and dyeing behavior of the hydrophilic fibers in the supercritical carbon dioxide fluid. The invention can not only solve the problems of high energy consumption, high discharge, high pollution in the traditional dyeing process with water bath, but also obtain better dyeing effect. Meanwhile, the operation in the invention is convenient, and the waterless dyeing can be implemented effectively, and the reaction is mild, avoiding the use of a large amount of water, heat and additives in high concentration in the traditional dyeing process, which has the features of being high efficiency and environmentally friendly with wide prospect of use.

The embodiments described above are merely preferred embodiments for the purpose of fully illustrating the invention, and the scope of the invention is not limited thereto. Equivalent substitutions or modifications made by those skilled in the art based on the present invention are within the scope of the present invention. The scope of the invention is defined by the claims.

The invention claimed is:

1. A fiber dyeing method using a mixed fluid medium, comprising steps of:
    (0) mixing a supercritical carbon dioxide fluid medium with steam to form a mixed fluid, which is used as a processing medium for dyeing;
    (1) loading dry fibers layer by layer in a porous yarn cage at a compactness, wherein the dry fibers are compacted mechanically;
    (2) placing the porous yarn cage after loading fibers in step (1) in a high pressure dyeing tank, and then sealing the dyeing tank and introducing a non-carbon dioxide medium to preprocess the dry fiber layers under a pressure of 0-1 MPa for 5-180 min;
    (3) after preprocessing in step (2), introducing the mixed fluid and a dissolved dye into the high pressure dyeing tank, and supercharging, heating the yarn cage and dyeing by holding temperature according to a preset dyeing process;
    (4) after dyeing, removing unfixed dyes by an online way by using clean supercritical carbon dioxide medium and cooling the dyeing system, and then recycling the fluid medium in the dyeing system to recover the pressure to atmospheric pressure and opening the dyeing tank, to complete the fiber dyeing in supercritical carbon dioxide fluid medium,
    wherein the non-carbon dioxide medium used in step (2) is saturated steam or superheated steam.

2. The fiber dyeing method using a mixed fluid medium according to claim 1, wherein the dry fibers are natural fibers, or synthetic fibers.

3. The fiber dyeing method using a mixed fluid medium according to claim 1, wherein, in step (1), loose fibers are compacted layer by layer uniformly by a mechanical external force, so that the fibers are loaded at the compactness.

4. The fiber dyeing method using a mixed fluid medium according to claim 1, wherein the porous yarn cage in step (1) is coated with a non-conductive surface material, and a plurality of apertures are distributed on the periphery of the yarn cage and on its central hollow tube.

5. The fiber dyeing method using a mixed fluid medium according to claim 1, wherein, in step (1), "layer by layer" means that the fibers are loaded or compacted with a thickness to form a layer, and then a next layer is formed in the same way, the process is repeated until a predetermined amount of fibers are loaded in the yarn cage.

6. The fiber dyeing method using a mixed fluid medium according to claim 1, wherein, in step (1), the fibers have a compactness of 50-300 kg/m$^3$ when loaded layer by layer in the porous yarn cage.

7. The fiber dyeing method using a mixed fluid medium according to claim 1, wherein, in step (3), the dissolved dye is an active disperse dye with an active group selected from the group consisting of a vinyl sulfone, a vinyl group, an s-triazine type, a nicotinic acid structure, and derivatives thereof.

8. The fiber dyeing method using a mixed fluid medium according to claim 1, wherein, in step (3), the dissolved dye is dissolved in a solvent selected from the group consisting of supercritical carbon dioxide, ethanol, acetone, methanol, and deionized water.

9. The fiber dyeing method using a mixed fluid medium according to claim 8, wherein, in step (3), two solvents are mixed at the ratio of 1:5 to 5:1.

10. The fiber dyeing method using a mixed fluid medium according to claim 1, wherein, in step (3), in the preset dyeing process, the temperature is 50-160° C., the pressure is 7-35 MPa, a ratio of dynamic and static cycle time of the fluid is 1:5-10:1, and the processing time is 10~180 min.

11. The fiber dyeing method using a mixed fluid medium according to claim 1, wherein, in step (4), during removing unfixed dyes by an online way, the temperature is 30-160° C., the pressure is 8-35 MPa, a ratio of dynamic and static cycle time of the fluid is 1:5-10:1, and the processing time is 10~120 min.

12. The fiber dyeing method using a mixed fluid medium according to claim 1, wherein, in step (4), after dyeing, the carbon dioxide is recycled by a recycling system for cyclic utilization, and the carbon dioxide in the dyeing system is recovered to atmospheric pressure for direct opening of the dyeing tank.

13. The fiber dyeing method using a mixed fluid medium according to claim 2, wherein the natural fibers are cotton, or processed hemp loose fibers, and the synthetic fibers are artificial fibers made from viscose, polyester, nylon or acrylic.

* * * * *